3,491,158
PROCESS FOR THE PREPARATION OF SATURATED ALIPHATIC ALCOHOLS
Manfred Reich, Marl, Germany, assignor to Chemische Werke Huls Aktiengesellschaft, Marl, Germany, a corporation of Germany
No Drawing. Filed Aug. 29, 1966, Ser. No. 575,512
Claims priority, application Germany, Nov. 26, 1965, C 37,500
Int. Cl. C07c 29/14
U.S. Cl. 260—638                                    3 Claims

ABSTRACT OF THE DISCLOSURE

Preparation of saturated aliphatic alcohols by hydrogenation of olefinically unsaturated aldehydes or of aliphatic saturated aldehydes containing traces of dilute olefinically unsaturated aldehydes in two stages employing dissimilar catalysts in the vapor phase, characterized by the use in the first stage of a copper-nicked catalyst on a carrier material composed of 97 to 75 percent by weight of silica gel and 3 to 25 percent by weight of copper and nickel as the activating metals, the copper content ranging from 60 to 80 percent by weight and the nickel content ranging from 40 to 20 percent by weight relative to the sum of the activating metals, and by the use in the second stage of a nickel or palladium catalyst or a mixture thereof on a carrier, the proportion of the catalyst or mixture of catalysts used in the second stage being equal to or less than ⅓ of the total volume of catalysts used in both stages.

---

It is known to prepare saturated aliphatic alcohols by catalytic hydrogenation of the appropriate saturated or unsaturated aldehydes.

The German Patent Nos. 838,746 and 848,944 describe hydrogenation in the liquid phase in the presence of a nickel catalyst, a process which results in a mixture of saturated alcohol and the saturated aldehyde. However, the yields obtained through this process are unsatisfactory.

The German Patent No. 931,827 describes a process carried out in the gaseous phase and in two stages using different catalysts for each stage, namely a copper-nickel catalyst on a carrier in the first stage and a modified copper-carrier catalyst in the second stage. This process yields saturated alcohols together with substantial quantities of saturated aldehydes and unsaturated aldehydes and alcohols. The unsaturated alcohols are particularly undesirable because they are very difficult to separate from the saturated alcohol by distillation.

Other improved processes which result in products of greater purity employ a pure copper-carrier catalyst, possibly with a known modifier, for the first hydrogenation stage of unsaturated aldehydes in the gaseous phase and a copper-nickel-carrier catalyst or a pure nickel-carrier catalyst for the second stage (German Patent Nos. 1,152,393 and 1,161,250).

The British Patent No. 938,028 proposes employment of such system of catalysts in connection with the hydrogenation of saturated aldehydes.

In the case of the process disclosed by French Patent No. 1,349,816 a pure copper-carrier catalyst is used for the first stage and a palladium catalyst for the second stage. However, the saturated alcohols obtained by the last-mentioned process still contain detectable quantities of unsaturated compounds and the proportion of saturated aldehydes is at least one part in one hundred.

I have now developed a process for the preparation of saturated aliphatic alcohols by hydrogenation of unsaturated aldehydes or of saturated aldehydes containing impurities in the form of unsaturated compounds in two stages employing dissimilar catalysts in the vapor phase, characterized by the use in the first stage of a copper-nickel catalyst on a carrier material composed of 97 to 75 percent by weight of silica gel and 3 to 25 percent by weight of copper and nickel as the activating metals, the copper content ranging from 60 to 80 percent by weight and the nickel content ranging from 40 to 20 percent by weight relative to the sum of the activating metals, and by the use in the second stage of a nickel or palladium catalyst or a mixture thereof on a carrier, the proportion of the catalyst or mixture of catalysts used in the second stage being equal to or less than ⅓ of the total volume of catalysts used in both stages. The copper-nickel catalyst used in the first stage may contain the usual modifying agents for copper catalysts such as chromium or chromium oxide, magnesium or phosphate.

Due to the employment of the copper-nickel catalyst in the first stage very pure alcohols will be obtained which can be used directly in many cases, for example for esterification, without purification. However, in certain instances it will be advisable to purify the substances obtained. The copper-nickel-carrier catalysts are prepared by applying to the carrier material the proper copper and nickel salts, possibly together with the above mentioned modifying agents, preferably in the form of solutions, and by the subsequent reduction of the catalysts so obtained in a stream of hydrogen, or by the employment of other standard reducing agents which are known per se. The nickel or palladium catalysts used in the second stage are prepared by applying to the carrier material nickel or palladium salts, preferably in the form of solutions, and by the subsequent reduction of the catalysts so obtained in a stream of hydrogen or by the employment of other standard reducing agents.

Silica gel, which is the only carrier material used for the copper-nickel catalyst of the first stage can be used as carrier material for the nickel or palladium catalysts of the second stage but other carrier materials such as aluminum oxide, kieselguhr, pumice, clay bodies, activated charcoal or magnesium oxide can be used as the carrier for the catalyst of the second stage. Preferred materials are aluminum oxide, silica gel and pumice. The proportions of the activating metal palladium, relative to the sum total of the palladium-carrier catalyst, ranges from .005 to 10 percent by weight, preferably .01 to 3, and especially .05 to 1 percent by weight. The proportions of the activating metal nickel, relative to the sum total of the nickel-carrier catalyst, ranges from 1 to 60 percent by weight, preferably 5 to 40, and especially 8 to 20 percent by weight. The proportion of the copper-nickel catalyst, employed in the first stage, is at least ⅔ of the total volume of the catalysts used for the two stages and may be increased up to 98% of the total volume. If a nickel catalyst is used in the second stage, its proportion of the total volume of the catalysts of both stages is preferably 15 to 25%, and if a palladium catalyst is used, a proportion of 5 to 10% is advantageous.

The aldehydes to be hydrogenated are conducted in vapor form and mixed with hydrogen first over the copper-nickel catalyst, and the vaporized product is then guided over the nickel or palladium catalyst or a mixture thereof. The catalysts can be located in two separate reaction vessels but it is more advantageous to arrange them within a single reaction vessel, preferably a reaction tube, in order to avoid multiple vaporization.

The hydrogenation temperature ranges between 120 and 220° C., preferably between 140 and 200° C.

The pressure within the hydrogenation chamber is optional provided that the aldehydes to be hydrogenated as well as the hydrogenated products are kept in the gaseous state.

The process permits a hydrogenation of unsaturated aldehydes under flexible conditions and will result in very pure alcohols and excellent yields.

EXAMPLE 1

Over 1 liter of catalyst, filled into a tube, there was conducted at a temperature of 160° C. and an operating absolute pressure of 15 atmospheres 150 g./h. of a water-containing, vaporized (88%) crotonaldehyde together with 1500 Nl./h. of hydrogen. Thereupon condensation was carried out within the pressure section of a cooling system.

The catalyst contained 9 percent by weight of copper, 3 percent by weight of nickel and .4 percent by weight of chromium on silica gel as the carrier material. It had been prepared by applying to the carrier material the appropriate quantities of copper carbonate, nickel formate and chromic acid from ammoniacal-aqueous solution and treatment in a stream of hydrogen at approximately 200° C.

The condensed aqueous n-butanol contained .003 percent by weight of unsaturated compounds, calculated as crotonaldehyde and detected by bromination, as well as .05 percent by weight of aldehyde, calculated as butyraldehyde. The loss caused by formation of hydrocarbons was less than .5%. No acetals could be detected.

The condensed, crude n-butanol, produced in the first stage was vaporized and conducted at a temperature of 160° C. and an operating absolute pressure of 15 atmospheres in a quantity of 150 g./h. together with 1500 Nl./h. of hydrogen over 100 ml. of catalyst, filled into a tube, the catalyst containing .5 percent by weight of palladium on aluminum oxide. Thereupon condensation was carried out within the pressure section of a cooling system.

The condensed, discharged product was aqueous n-butanol (approx. 90%) and contained approximately .02% of aldehyde, calculated as butyraldehyde. Unsaturated compounds could not be detected (less than .0005%). A loss caused by formation of hydrocarbons could not be determined. No acetals could be detected.

EXAMPLE 2

Over the catalyst described in example 1, containing 9 percent by weight of copper, 3 percent by weight of nickel and .4 percent by weight of chromium on silica gel, and under the conditions specified in Example 1, there was conducted 150 g./h. of 2-ethylhexenal-1 in vapor form together with 1500 Nl./h. of hydrogen. Condensation was then carried out within the pressure section of a cooling system. The condensed hydrogenation product was 2-ethylhexanol-1, containing .006 percent by weight of unsaturated compounds, calculated as ethylhexenal and detected by bromination, and .06 percent by weight of aldehyde, calculated as ethylhexanal. The loss caused by formation of hydrocarbons was less than .5%. No acetals could be detected.

The condensed, crude 2-ethylhexanol-1, obtained in the first stage, was vaporized and conducted at a temperature of 160° C. and an operating absolute pressure of 15 atmospheres in a quantity of 150 g./h. together with 1500 Nl./h. of hydrogen over 100 ml. of catalyst, filled into a tube, the catalyst containing .5 percent by weight of palladium on aluminum oxide.

The condensed, discharged product was 2-ethylhexanol-1 and contained .04% of aldehyde, calculated as ethylhexanal. Unsaturated compounds could not be detected (less than .005%). A loss caused by formation of hydrocarbons could not be determined. No acetals could be detected.

EXAMPLE 3

The lower portion of a reaction tube was filled with .1 liter of a catalyst which contained .5 percent by weight of palladium on aluminum oxide, and the upper part with .9 liter of a catalyst which contained 9 percent by weight of copper, 3 percent by weight of nickel and .4 percent by weight of chromium on silica gel. The catalysts were activated by treatment in a stream of hydrogen at approximately 200° C. Over this system of catalysts there was conducted from the top to the bottom at 160° C. and at an operating absolute pressure of 15 atmospheres 150 g./h. of vaporized 2-ethylhexenal-1 together with 1500 Nl./h. of hydrogen. Thereupon condensation was carried out within the pressure section of a cooling system. The condensed hydrogenation product was 2-ethylhexanol-1 and contained .07% of aldehyde, calculated as ethylhexanal. Unsaturated compounds could not be detected (less than .0005%). The loss caused by formation of hydrocarbons was below .5%. No acetals could be detected. After 200 days of operation no significant change in yield occurred. The hydrogenation temperature was increased gradually within this period of time to 180° C.

After distillation at a pressure of 20 torr and a head temperature of 93° C., the product still contained .01 percent by weight of aldehyde, calculated at ethylhexanal. Unsaturated compounds could not be detected (less than .0005%). For the purpose of comparison, there was used in the lower part of the tube, .1 liter of a catalyst containing .5 percent by weight of palladium on aluminum oxide, and above it in the upper part .9 liter of a catalyst containing 20% of copper and 1% of chromium on silica gel, and the hydrogenation was carried out under the same conditions. The yield was 2-ethylhexanol-1 which contained .9 percent by weight of aldehyde, calculated as ethylhexanal and .05 percent by weight of unsaturated compounds, calculated as ethylhexenal and detected by bromination.

After distillation, carried out under identical conditions as before, the product still contained .08 percent by weight of aldehyde, calculated as ethylhexanal, and .02 percent by weight of unsaturated compounds, calculated as ethylhexenal.

Therefore, a significant increase in the content of unsaturated compounds and in the aldehyde content is apparent in the product obtained by hydrogenation as well as after its distillation.

EXAMPLE 4

The lower portion of a reaction tube was filled with .2 liter of a catalyst which contained 8 percent by weight of nickel on pumice and which had been prepared by applying an ammoniacal-aqueous nickel formate solution, and the upper portion with .8 liter of a catalyst which contained 9 percent by weight of copper, 3 percent by weight of nickel and .4 percent by weight of chromium on silica gel as the carrier material. The catalysts were activated by treatment in a stream of hydrogen at approximately 200° C. Over this system of catalysts there was conducted from the top to the bottom at 160° C. and an operating absolute pressure of 15 atmospheres 150 g./h. of vaporized 2-ethylhexenal-1 together with 1500 Nl./h. of hydrogen. Thereupon condensation was carried out within the pressure section of a cooling system.

The condensed 2-ethylhexanol-1 contained .08 percent by weight of aldehyde, calculated as ethylhexanal, and .002 percent by weight of unsaturated compounds, calculated as ethylhexenal and detected by bromination. The loss caused by the formation of hydrocarbons was below .5%. No acetals could be detected. After 200 days of operation no significant changes in yield occurred. The hydrogenation temperature was increased gradually within this period of time to 180° C. After the distillation, carried out by use of the same equipment and under the same conditions as set forth in Example 3, the product still contained .02 percent by weight of aldehyde, calculated as ethylhexanal, and .001 percent by weight of unsaturated compounds, calculated as ethylhexenal and detected by bromination. For purpose of comparison, the copper-nickel catalyst was replaced by .8 liter of catalyst containing 20% of copper and 1% of chromium on silica gel, and the condensed hydrogenation product, 2-ethylhexanol-1, contained .7 percent by weight of aldehyde, calculated as ethylhexanol, and .08% by weight of unsaturated compounds, calculated as ethylhexenal and detected by bromination. Therefore, a significant increase in the content of unsaturated compounds and in the aldehyde content is apparent.

EXAMPLE 5

Over 1 liter of catalyst, filled into a tube and containing 9 percent by weight of copper, 3 percent by weight of nickel and .4 percent by weight of chromium on silica gel as carrier material, there was conducted at a temperature of 180° C. and at a working pressure of .1 atmospheres gauge 150 g./h. of vaporized butyraldehyde which contained .07% of unsaturated compounds, calculated as crotonaldehyde and detected by bromination, together with 900 Nl./h. of hydrogen. Thereupon condensation was carried out in a cooling system, in the final stage by use of cold traps.

The condensed hydrogenation product was butanol and contained .08 percent by weight of aldehyde, calculated as butyraldehyde, and .01 percent by weight of unsaturated compounds, calculated as crotonaldehyde and detected by bromination. The loss caused by formation of hydrocarbons was below .5%. No acetals could be detected. The crude butanol was hydrogenated under the same conditions as existed throughout the first stage and as catalyst for the second stage there was used .2 liter of a palladium catalyst on aluminum oxide and containing .5 percent by weight of palladium.

The condensed butanol contained .05 percent by weight of aldehyde, calculated as butyraldehyde and less than .001 percent by weight of unsaturated compounds, calculated as crotonaldehyde. A loss caused by the formation of hydrocarbons could not be detected. No acetals were found. No aldehyde or unsaturated compounds could be detected in the distilled product.

EXAMPLE 6

Over 1 liter of catalyst, filled into a tube and containing 9 percent by weight of copper, 3 percent by weight of nickel and .4 percent by weight of chromium on silica gel as the carrier material, there was conducted at a temperature of 180° C. and a working pressure of .1 atmospheres gauge 150 g./h. of vaporized butyraldehyde which contained .07% of unsaturated compounds, calculated as crotonaldehyde and detected by bromination, together with 900 Nl./h. of hydrogen. Thereupon condensation was carried out in a cooling system, in the final stage by use of cold traps.

The condensed hydrogenation product was butanol and contained .08 percent by weight of aldehyde, calculated as butyraldehyde, and .01 percent by weight of unsaturated compounds, calculated as crotonaldehyde and detected by bromination. The loss caused by formation of hydrocarbons was below .5%. No acetals could be detected. The crude butanol was hydrogenated under the same conditions as existed throughout the first stage and as catalyst for the second stage there was used .3 liter of a catalyst containing 15 percent by weight of nickel on silica gel. The condensed butanol contained .03 percent by weight of aldehyde, calculated as butyraldehyde, and less than .0001 percent by weight of unsaturated compounds, calculated as crotonaldehyde. No aldehydes or unsaturated compounds could be detected in the distilled product.

EXAMPLE 7

Over 1 liter of catalyst, filled into a tube and prepared in the manner described in Example 1, containing 9 percent by weight of copper, 3 percent by weight of nickel and .4 percent by weight of chromium on silica gel, there was conducted at a temperature of 180° C. and a working pressure of .05 atmosphere gauge 60 g./h. of vaporized, water-containing crotonaldehyde (88%) together with 900 Nl./h. of hydrogen. Thereupon condensation was carried out in a cooling system, in the final stage by use of cold traps.

The condensed aqueous n-butanol contained .09 percent by weight of aldehyde, calculated as butyraldehyde, and .01 percent by weight of unsaturated compounds, calculated as crotonaldehyde and detected by bromination. The loss caused by formation of hydrocarbons was below .5%. No acetals could be detected. The crude butanol was hydrogenated under the same conditions as existed throughout the first stage and as catalyst for the second stage there was used .1 liter of a palladium catalyst on aluminum oxide, containing .5 percent by weight of palladium.

The condensed aqueous butanol contained .05 percent by weight of aldehyde, calculated as butyraldehyde, and less than .001 percent by weight of unsaturated compounds, calculated as crotonaldehyde. A loss caused by the formation of hydrocarbons could not be detected. No acetals were found. No aldehydes or unsaturated compounds could be detected in the distilled product.

I claim:

1. Process for the production of a saturated aliphatic alcohol which comprises passing an aldehyde selected from the group consisting of crotonaldehyde, butyraldehyde and 2-ethylhexenal hydrogen at a temperature of from 120 to 220° C. and under a corresponding pressure at which the reactants remain in the gaseous state in contact with a first body of catalyst consisting essentially of from 97 to 75% by weight of a silica gel and from 3 to 25% by weight of copper and nickel, the ratio of copper to nickel being 60 to 80% by weight of copper and 40 to 20% by weight of nickel, said first body of catalyst being prepared by applying copper and nickel salts to silica gel and then reducing, and then in contact with a second body of catalyst consisting essentially of a carrier and at least one metal selected from the group consisting of nickel and platinum, said carrier being selected from the group consisting of silica gel, aluminum oxide, kieselguhr, pumice, clay and active carbon, the amount of metal in said second catalyst being within the range from .005 to 10% by weight for palladium and within the range from 1 to 60% by weight for palladium and within the range from 1 to 60% by weight for nickel, and the volume of said first body of catalyst being from ⅔ to 98% of the total volume of said first and second bodies of catalyst.

2. Process as defined in claim 1 wherein the catalysts are reduced by being subjected to a stream of hydrogen at a temperature of about 200° C.

3. Process as defined in claim 1 in which the quantity of hydrogen mixed with the substance to be hydrogenated is at least chemically equivalent thereto.

References Cited

UNITED STATES PATENTS

| 2,119,899 | 6/1938 | Zorn et al. | |
|---|---|---|---|
| 3,288,866 | 11/1966 | Cooper. | |
| 3,371,050 | 2/1968 | Taylor et al. | 252—459 |

FOREIGN PATENTS

| 249,540 | 5/1963 | Australia. |
|---|---|---|
| 316,399 | 8/1929 | Great Britain. |

LEON ZITVER, Primary Examiner

JOSEPH E. EVANS, Assistant Examiner

U.S. Cl. X.R.

252—459, 457, 458, 437, 466, 473

UNITED STATES PATENT OFFICE
CERTIFICATE OF CORRECTION

Patent No. 3,491,158　　　　　　　Dated January 20, 1970

Inventor(s)　MANFRED REICH

It is certified that error appears in the above-identified patent and that said Letters Patent are hereby corrected as shown below:

Claim 1, lines 45 and 46, namely:

"for palladium and within the range from 1 to 60% by weight" is a repetition and should be deleted.

SIGNED AND
SEALED
JUN 23 1970

(SEAL)
Attest:

Edward M. Fletcher, Jr.
Attesting Officer

WILLIAM E. SCHUYLER, JR.
Commissioner of Patents